W. ERBEN.
APPARATUS FOR EXTRACTING VEGETABLE WAX.
APPLICATION FILED MAY 6, 1911.
1,033,684.
Patented July 23, 1912.
3 SHEETS—SHEET 1.
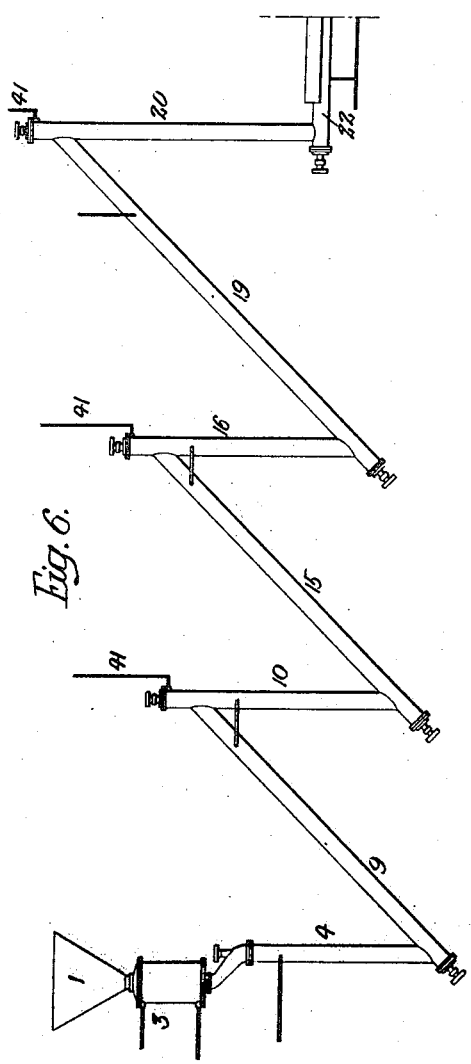
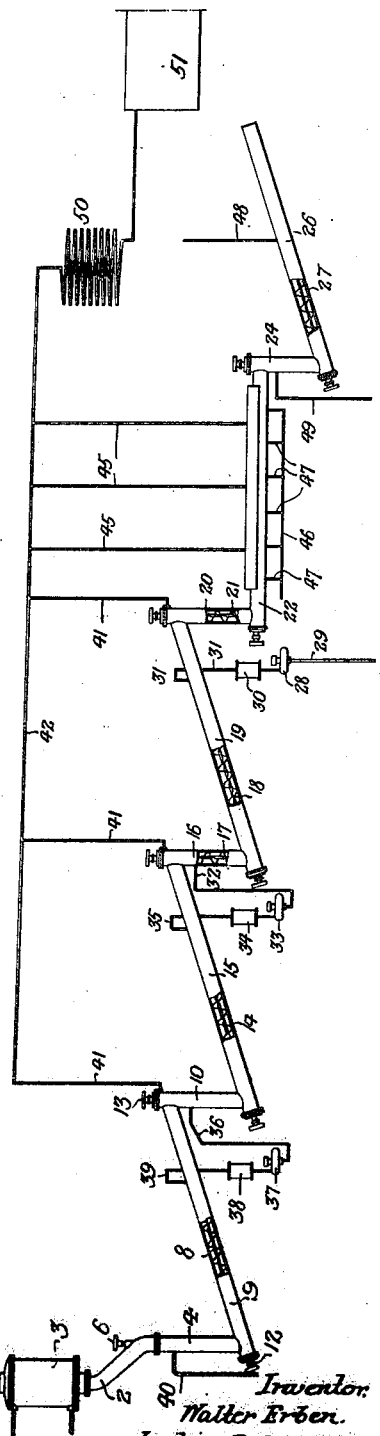

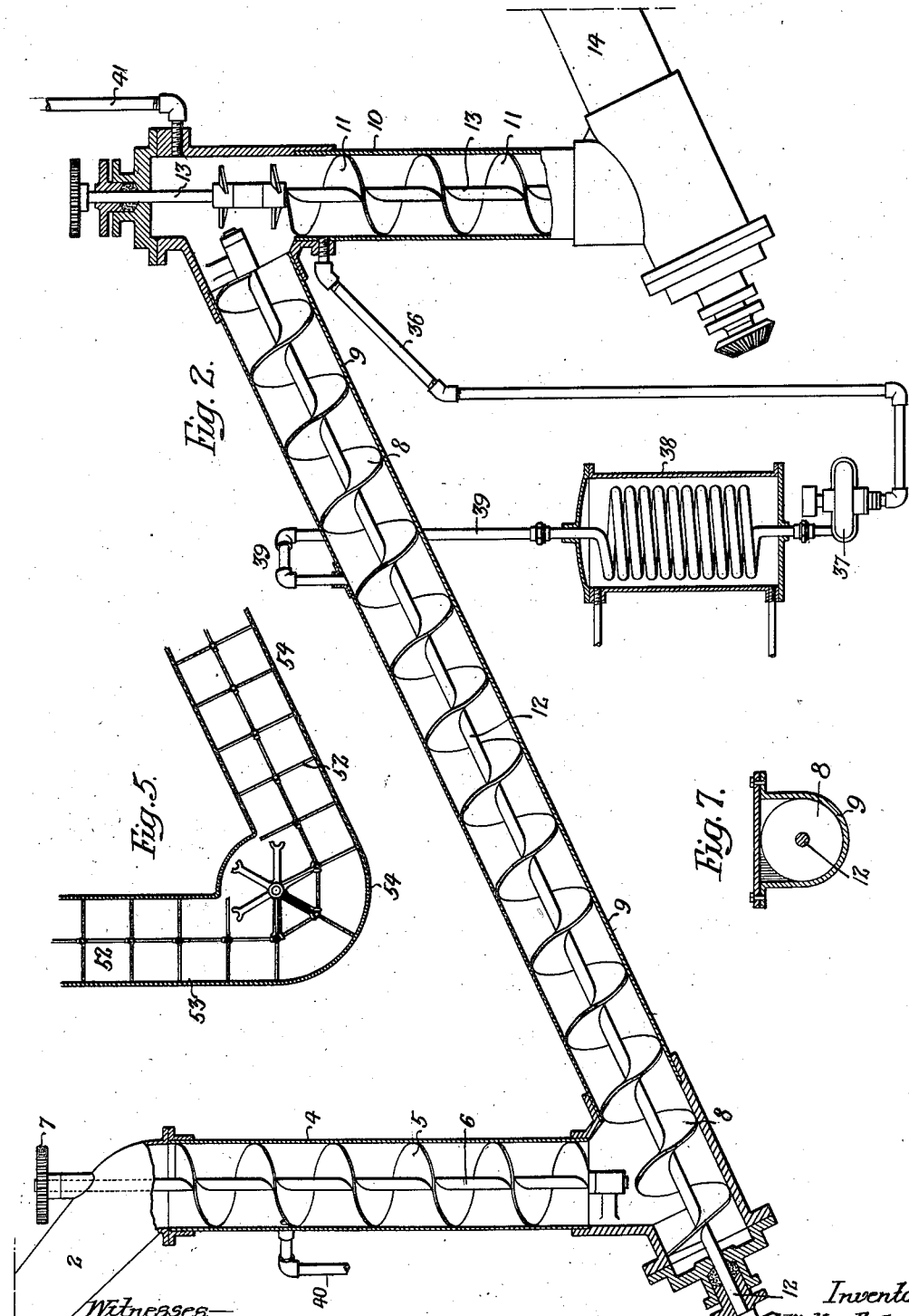

W. ERBEN.
APPARATUS FOR EXTRACTING VEGETABLE WAX.
APPLICATION FILED MAY 6, 1911.
1,033,684.
Patented July 23, 1912.
3 SHEETS—SHEET 3.
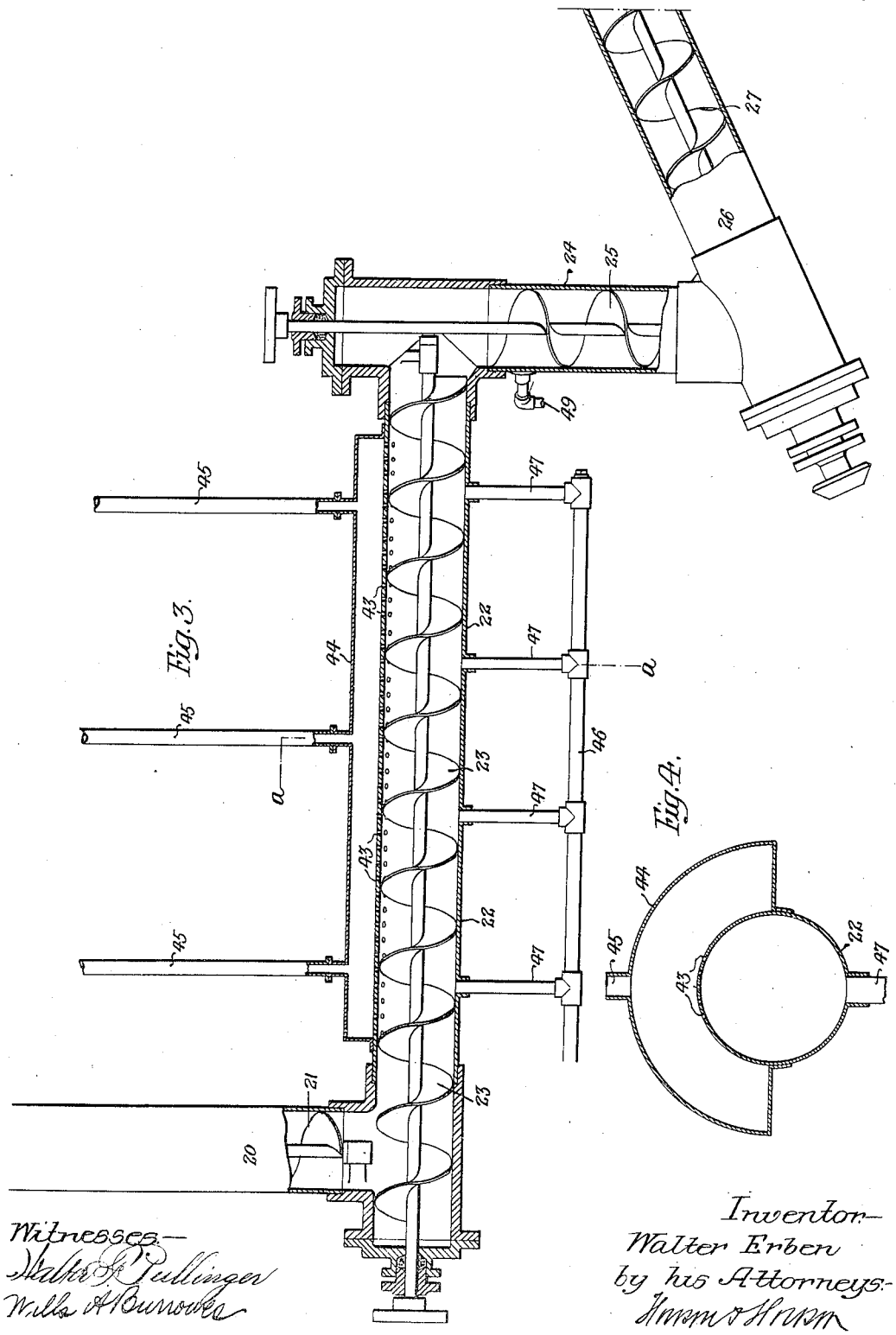

UNITED STATES PATENT OFFICE.

WALTER ERBEN, OF RADNOR, PENNSYLVANIA.

APPARATUS FOR EXTRACTING VEGETABLE-WAX.

1,033,684.
Specification of Letters Patent. Patented July 23, 1912.
Application filed May 6, 1911. Serial No. 625,622.

*To all whom it may concern:*

Be it known that I, WALTER ERBEN, a citizen of the United States, residing in Radnor, county of Delaware, State of Pennsylvania, have invented certain Improvements in Apparatus for Extracting Vegetable-Wax, of which the following is a specification.

The object of my invention is to construct an apparatus for extracting vegetable wax from plants, and more particularly for extracting the wax from the candalilla plant. This object I attain in the following manner, reference being had to the accompanying drawings, in which:—

Figure 1, is a side view, partly in section, illustrating, in diagram, my improved apparatus; Fig. 2, is a longitudinal, sectional view of one end of the apparatus; Fig. 3, is a longitudinal, sectional view of the other end of the apparatus; Fig. 4, is a transverse, sectional view on the line $a$—$a$, Fig. 3; Fig. 5, is a view illustrating a modification of the conveyer, which may be used with my improved apparatus; Fig. 6, is a view of a modification of the apparatus in which the circulating pump is dispensed with; and Fig. 7, is a sectional view illustrating a modification of the conveyer tube.

The material to be treated, in the present instance, is broken in small pieces and traversed through the apparatus in the presence of a liquid, preferably a solvent, which frees the wax from said material. The solvent, containing the wax, is then carried to a settling tank, from which it passes to a still, a condenser, and finally to a storage tank; the vapor being carried off to condensing coils.

The material for whose treatment my invention is particularly adapted is a plant known as the "candalilla" plant whose small branches are cut into small sections and preferably shredded, so as to open up the fibers to the action of the solvent, which, in the present instance, is naphtha.

In Figs. 1, 2 and 3 of the drawings, I have shown the handling mechanism in the form of a screw conveyer, but it will be understood that a flight, or other type of conveyer, may be used without departing from the essential features of the invention. In these drawings, 1 is a hopper, into which the material is fed. This hopper connects with a tube 2, around which is a water jacket 3, through which a current of cold water flows to condense the naphtha, or solvent vapors, as they rise from the liquid. This tube 2 connects with a vertical tube 4, in which is a screw conveyer 5, mounted on a shaft 6. In the present instance, the upper end of this shaft passes through a stuffing box and is provided with a wheel 7, by which it is driven. The lower end of the shaft is mounted in a suitable bearing directly above the feed end of the screw conveyer 8, which is mounted in an inclined tube 9, whose upper end communicates with the upper end of a vertical tube 10, in which is a screw conveyer 11. The screw conveyer 8 is mounted on a shaft 12, having a driving wheel in the present instance, at its lower end. The screw conveyer 11 is mounted on a shaft 13, driven from its upper end and the vertical tube 10 connects with a second inclined tube 14, in which is mounted a screw conveyer 15, driven in the same manner as the screw conveyer 8. The upper end of the tube 14 in turn communicates with another tube 16, in which is a screw conveyer 17, and the tube 16 communicates with a third inclined tube 18, in which is a screw conveyer 19. The upper end of this last mentioned tube communicates with a vertical tube 20, having a screw conveyer 21. All of the vertical screw conveyers are driven from the upper end, while the inclined screw conveyers are driven from their lower ends in the present instance.

The tube 20 communicates with a horizontal tube 22, in which is a screw conveyer 23, and this tube 22 communicates with a vertical tube 24, in which is a screw conveyer 25. The tube 24, in turn, communicates with an inclined tube 26 in which is a screw conveyer 27 for discharging the material from the apparatus after the wax has been extracted therefrom.

The naphtha, or other solvent, is introduced into the apparatus near the upper end of the inclined tube 18, by means of a pump 28, to which is connected a supply pipe 29 from a storage tank. The pump drives the solvent through a heater 30, of any suitable type, and through a pipe 31 into the conveyer tube 18. Said solvent then passes down this tube in a direction opposite to the direction of travel of the material and rises in the tube 16; discharging through the overflow pipe 32 into the feed end of a pump 33, which forces it through a heater 34, and a pipe 35, to the upper end of the inclined conveyer tube 14. The solvent then flows down this tube and up the tube 10; discharging through the overflow pipe 36 into a pump 37, which forces it through a heater 38 and through a pipe 39 to the first inclined tube 9. Said solvent, with the extracted wax, flows down the tube 9, up the tube 4, and out of the apparatus, through the discharge pipe 40 to the settling tank from whence, with the wax, it is carried to a still; the naphtha being then conveyed to a storage tank. The vapor is carried off at intervals through the vapor pipes 41, communicating with the upper end of each inclined tube and connecting with the main 42, leading to the condenser coils 50 which, in turn, communicate with the storage tank 51.

The horizontal conveying tube 22 forms a still to drive off the solvent from the material after it passes from the tubes through which the solvent flows. In the present instance, this still is made in the following manner:—The tube 22 has an upper perforated section 43 surrounded by a shell 44, greater in diameter than the tube. Vapor pipes 45 lead from this shell to the main 42. Steam is introduced to the still through the steam pipes 46, having branches 47 communicating with the bottom of the tube 22 so that, as the material is carried through the tubular still 22, the steam penetrates the mass of fibers and drives off the solvent from the same.

In order to prevent the escape of vapor from the discharge end of the apparatus, I provide a water seal consisting of the vertical tube 24 and the inclined tube 26 in which water is admitted through a pipe 48 and from which it escapes through a pipe 49. After the fiber, or other material, passes through this water seal it is discharged by the conveyer 27 from the end of the tube 26 into any suitable receptacle or conveyer.

While I have referred to "naphtha" as the solvent used, any other suitable solvent may be employed without departing from the essential features of the invention and, if desired, in place of a solvent, hot water, or steam, may be used to free the wax from the fiber; the separation in such case being accomplished by melting and the wax being separated from the water by decantation.

In some instances, I may arrange the conveyers so that pumps will be unnecessary to convey the solvent through the apparatus. This result may be accomplished by arranging the sections of the tubes on different levels, as illustrated in Fig. 6.

The blades of the screw conveyer may be perforated, so as to allow the solvent to flow more readily through the material in a direction opposite to its direction of travel, or the conveyers may be so proportioned, in respect to the tubes, that there will be sufficient space for the solvent to flow in a direction opposite to the travel of the material.

While I have illustrated an apparatus in which the solvent travels in a direction opposite to that of the material, I may use an apparatus in which the solvent travels, with the material, to a certain point; the solvent being separated from the material at this point, or, if found desirable, the pipes may be so arranged that the solvent can flow from each end of the apparatus and be carried away from the center thereof, without departing from the essential features of the invention.

In place of the screw conveyers shown in the main views of the drawings, flight conveyers 52 may be used, as shown in Fig. 5. The tubes 52 and 54, in this instance, are shaped so as to receive the carrying run of the said flight conveyer 52, which may be of any of the ordinary types used for conveying shredded material.

I claim:

1. The combination in an apparatus for extracting vegetable wax from fibers, of a series of vertical and inclined tubes, a conveyer for moving the material through said tubes, a supply pipe for the solvent, a pump, a heater through which the solvent passes to the apparatus, an outlet for the solvent with the freed wax, intermediate pumps and heaters communicating with the several vertical and inclined tubes for conveying the solvent through the apparatus in a direction opposite the direction of travel of the material, vapor tubes communicating with the upper ends of each of the inclined conveying tubes, a main with which the said vapor tubes communicate, and a condenser for receiving the vapors from said main.

2. The combination in an apparatus for extracting vegetable wax from fibers, of a series of vertical and inclined tubes, a still, screw conveyers in said tubes, a horizontal tube, a jacket partially surrounding said tube, a steam supply pipe communicating with the tube, a screw conveyer arranged to convey the material through the said tube, a water seal at the discharge end of the apparatus consisting of a vertical and an inclined tube, screw conveyers therein, with a water jacketed inlet for condensing the solvent vapors, a supply pipe for the solvent communicating with the last inclined tube of the series before the still, a heater, a pump for forcing the solvent into the said inclined tube and through the pump, an overflow discharge pipe for the solvent and the freed wax at the feed end of the machine, intermediate pumps and heaters, pipes forming communication between the same and between the vertical and horizontal tubes, a vapor main, vapor pipes communicating with the main and with the upper end of the inclined tube, vapor pipes forming a communication between the still and the said main, and a condenser with which the said main communicates.

In testimony whereof, I have signed my name to this specification, in the presence of two subscribing witnesses.

WALTER ERBEN.

Witnesses:
 WM. E. SHUPE,
 WM. A. BARR.